United States Patent Office 3,027,362
Patented Mar. 27, 1962

3,027,362
PROCESS OF PRODUCING REACTIVE POLYMERIC AZO DYES
Donald James Gale and Roy Emerson Starn, Jr., Wilmington, Del., assignors to E. I. du Pont de Nemours and Company, Wilmington, Del., a corporation of Delaware
No Drawing. Filed Dec. 19, 1958, Ser. No. 781,488
2 Claims. (Cl. 260—153)

This invention relates to novel compositions of matter useful as reactive dyes for materials possessing in their structure exchangeable hydrogen atoms. More particularly, this invention deals with dyes for textile fiber and similar materials (including paper, leather, plastic film, etc.) which possess in their molecules or micelles reactive radicals such as OH, ONa or $NH_2$. Common illustrations of such materials are cellulosic fiber, wool, silk, nylon and polyvinyl alcohol film.

It is an object of this invention to provide novel reactive dyes for fibers of the above types, which are characterized by a high degree of fixation and excellent fastness qualities to washing. A further object is to provide a novel series of dyes whereby the shade to be obtained on the fiber may be varied at will and determined in advance, during the synthesis of the dye. Other objects and achievements of this invention will become apparent as the description proceeds.

The nature of fiber-reactive dyes and their inherent shortcoming of low fixation are discussed at length in our copending application of same date herewith, Serial No. 781,480, filed jointly with S. N. Boyd, Jr.

The said copending application also offers a solution to the above shortcoming by providing novel reactive dyes which are characterized by a polymeric structure, each polymeric chain containing a plurality of chromophores possessing sulfo or carboxy groups, and a plurality of monochlorotriazine rings bound to the other portions of the molecule of NH groups, there being at least one such chlorotriazine ring per chromophore.

Our present invention is concerned particularly with the processes for producing said polymers, and aims to produce an alternative process which is particularly applicable to the production of polymers of the azo dye class. Other objects and achievements of this invention will appear as the description proceeds.

According to this invention, a diazotiazable aromatic dye intermediate having two primary amino groups is reacted in substantially equimolecular proportions and in aqueous medium with a cyanuric halide, such as the chloride or bromide, at low temperature (0° to 5° C.), and in the presence of an acid absorbing agent such as sodium carbonate or acetate. Taking the chloride as typical, this results in the formation of a monomeric intermediate compound of form $H_2N$—Q—NH—G—Cl, wherein Q is the radical of the diazotizable diamine exclusive of the amino groups, while G stands for the monochlorotriazine radical

The monomeric intermediate is then subjected to diazotization, which may be effected by adding HCl and $NaNO_2$ to the ice cold reaction mass in which the monomer is formed, without troubling to isolate the latter. The mass is then rendered alkaline and while maintaining the ice temperature (0° to 5° C.), an optional coupling component is added, which possesses both an $NH_2$ group and an OH group with a replaceable H-atom in position ortho of the OH group, and which may possess further a sulfo or carboxy group. This coupling reaction results in a monomeric amino-azo dye of the formula

$H_2N$—R here being the radical of the coupling component, which is coupled ortho to its OH group. In the two steps thus far set down, R and Q are so chosen that at least one of them has a water-solubilizing group, such as sulfo or carboxy.

When the reaction mass is next warmed up to a temperature in the range of 10° to 70° C., additional acid absorbing agent being added if and as needed, polymerization takes place by elimination of the second Cl atoms from the cyanuric chloride nuclei. The polymeric product may then be isolated in customary manner by salting out, filtering and drying.

The final product is a "polymer" which possesses at least two repeating units of the form

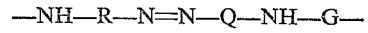

as above defined. The upper limit of the number of repeating units is immaterial so long as the recovered polymer possesses the quality of being soluble in water to a concentration commonly used in dye baths (about 0.5 to 4% by weight).

The terminal groups of the polymer will be radicals selected at random from the group $H_2N$—R— and G—OH, R and G being as above defined, and the terminal OH group arising from hydrolysis of the second Cl atom of the final G—Cl group.

In the average case, all the Q's and R's in the polymer will be respectively alike. It is possible, however, to start with a mixture of two different azo dyes of the above general formula whereby the resulting polymeric chains will contain dye radicals of different Q's or different R's intermixed at random, the average ratio of one to another being, however, proportional to the original ratio of the two azo dyes. In this fashion, the shade or other quality of the eventual dyeing may be modified at will and predetermined in advance. For instance if an orange azo dye of form

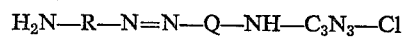

is intermixed with a blue azo dye of form

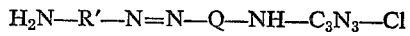

in suitable proportions, prior to condensation with cyanuric chloride, grey and black dyes may be prepared.

Without limiting this invention the following examples are given to illustrate our preferred mode of operation. Parts mentioned are by weight.

*Example 1*

(a) *Preparation of dye monomer.*—A solution of 9.4 parts of 2,4-diaminobenzene-sulfonic acid in 50 parts of water and enough 2 N NaOH to give a pH of 7 was cooled to 0° to 5° C. and added to an agitated slurry of cyanuric chloride prepared by adding a solution of 9.25 parts of cyanuric chloride in 40 parts of acetone to 250 parts of cold (0° to 5° C.) water. The resulting mixture was agitated at 0° to 5° C. for 1.5 hours while the pH was maintained at 8 with 2 N $Na_2CO_3$. The pH was then adjusted to 7 with 2 N HCl, 13 parts of 10 N HCl were added followed by 12.2 parts of 5 N $NaNO_2$. The solution of the diazonium salt was agitated at a temperature of 0° to 5° C. for 30 minutes and the pH was then adjusted to 6 with 2 N $Na_2CO_3$. This solution was then added all at once to an ice cold solution prepared by dissolving 17 parts of 1-amino-8-naphthol-3,6-disulfonic acid in 100 parts of water with enough 10 N NaOH to give a pH of 7, and in addition, 8 parts of $Na_2CO_3$. The mixture was then held at 5° to 15° C. for one hour to give a solution of a violet azo dye consisting essentially of a product having the structure

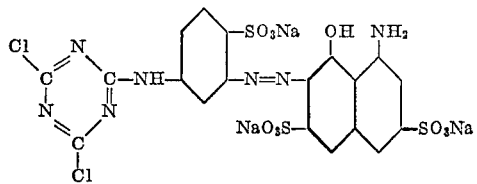

(b) *Polymerization of dye monomer.*—The above dye monomer was then polymerized by heating the violet solution at 35° to 40° C. for 1.5 hours while the pH was maintained at 8 with 2 N Na$_2$CO$_3$. The pH was then adjusted to 7 with 2 N HCl and the solution was cooled to 20° C., salted and filtered. The filter cake was dried to give 33 parts of a polymeric violet dye.

*Example 2*

By substituting in Example 1, 14.2 parts of 1-(2-methyl-4-amino-5-sulfophenyl)-3-methyl-5-pyrazolone in place of the 17 parts of 1-amino-8-naphthol-3,6-disulfonic acid, a polymeric dye which dyes cotton yellow shades was obtained. The dye thus produced, before it is polymerized, has the probable structure

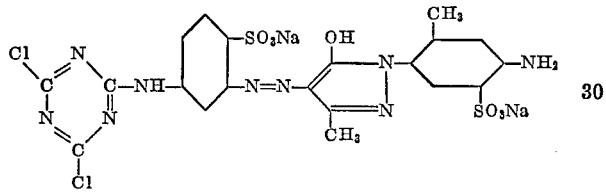

*Example 3*

A copolymeric dye which dyes cotton brown shades was prepared by substituting in Example 1 a mixture of 11.9 parts of 1-amino-8-naphthol-3,6-disulfonic acid and 3.3 parts of 1-(m-aminophenyl)-5-pyrazolone-3-carboxylic acid for the 17 parts of 1-amino-8-naphthol-3,6-disulfonic acid. Before polymerization, the reaction mass is believed to contain the following two monomers in admixture:

(a) The azo dye monomer formulated in Example 1, 70 mole-percent;

(b) An azo dye monomer of the formula

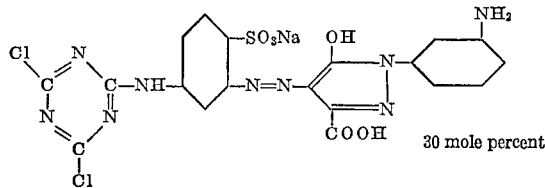

30 mole percent

*Example 4*

An ice cold slurry is prepared by adding a solution of 18.5 parts of cyanuric chloride in 80 parts of acetone to 500 parts of cold water (0° to 5° C.). An ice cold solution of 37 parts of 4,4'-diamino-2,2'-stilbene disulfonic acid in 100 parts of water, adjusted with 2 N NaOH to pH 11, is added. The resulting mixture is agitated at 0° to 5° C. for 2 hours, while the pH is maintained at 8 with 2 N Na$_2$CO$_3$. At this point the reaction mass contains in solution a monomeric condensation product of the formula

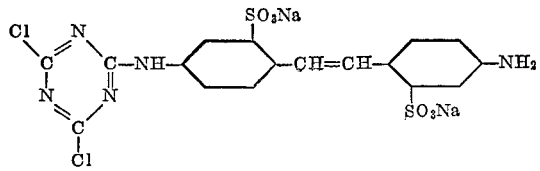

This compound is then diazotized and coupled to m-toluidine in conventional manner.

The resulting product, which is a monomer of type H$_2$N—D—NH—GCl (D and G having the same meaning as above), is polymerized in situ, by heating the aqueous coupling mass at 40° C. for 2.5 hours, while the pH is maintained at 9 with 2 N Na$_2$CO$_3$. The pH is then brought to 7 with 2 N HCl, the solution is cooled to 20° C., and the polymeric dye is isolated by salting and filtering.

*Example 5*

In 150 parts of H$_2$O are dissolved 18.8 parts (0.1 mole) of 2,4-diaminobenzene-sulfonic acid at pH 7 with 10 N NaOH. The solution is then cooled to 0° to 5° C. and a solution of 18.5 g. (0.1 mole) of cyanuric chloride in 80 parts of acetone is added along with enough ice to keep the temperature below 5° C. The reaction mass is agitated at 0° to 5° C. for two hours. The pH is then adjusted to and maintained at 5 to 6, using 2 N Na$_2$CO$_3$, while agitating the mass at the same temperature for one hour. The compound thus formed has the probable structure

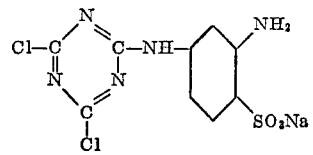

To this cold solution are added 28 parts of 10 N HCl followed by 24.5 parts of 5 N NaNO$_2$. This solution is agitated at 0° to 5° C. for 30 minutes and the pH is then adjusted to 6 with 2 N Na$_2$CO$_3$.

The solution of diazonium compound thus obtained is added to a solution, at 0° C. to 5° C., of 2-amino-8-naphthol-6-sulfonic acid which had been prepared by dissolving 23.9 parts (0.1 mole) of said amino-naphthol in 100 parts of water maintained at pH 7 with 10 N NaOH, followed by addition of 16.0 parts of sodium carbonate.

The coupling solution is agitated at 0° to 5° C. for one hour and the pH is adjusted to 7 with 2 N HCl. The reaction mass is then agitated at 35° to 40° C. for one hour while the pH is maintained at 8 with 2 N Na$_2$CO$_3$ and finally agitated at room temperature for 3½ days. It is salted with 375 parts of NaCl, filtered, and the filter cake is dried to give 150 parts of red powder.

When applied to cotton broadcloth, this dye gives a 92.2% fixation, and produces red dyeings of very good wash-fastness. The repeating unit of this polymer has the structure

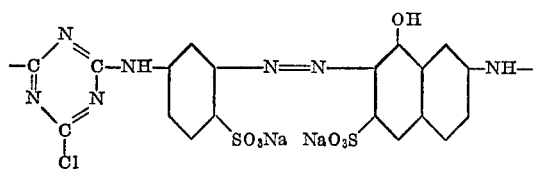

When the above synthesis is repeated using a 0.43 mole excess of 2-amino-8-naphthol-6-sulfonic acid, the excess acts as a chain stopper, resulting in the formation of some monomeric dye, and the mixture gives but a 63% fixation on the same cloth.

It will be understood that the details of the above examples may be varied widely without departing from the spirit of this invention. For instance, instead of preparing the intermediate monomers or isolating the final polymers as sodium sulfonates, they may be prepared and isolated in the form of any other convenient alkali-metal sulfonates, for instance those of potassium or lithium. Other variations and modifications will be readily apparent to those skilled in the art.

We claim as our invention:

1. A process of producing a water-soluble, polymeric azo dye adapted to react with fiber containing radicals of the group consisting of OH, ONa and $NH_2$, which comprises reacting, at ice temperature and in the presence of an acid absorbing agent, essentially equimolecular quantities of cyanuric chloride and of an aromatic diamine of the form $H_2N$—Q—$NH_2$, wherein Q is an aromatic radical of the benzene and stilbene series, said radical being free of OH and $NH_2$ groups and possessing from 0 to 2 sulfo groups, whereby to form a diazotizable intermediate of the formula $H_2N$—Q—NH—G—Cl G representing the monochlorotriazine radical, diazotizing the intermediate thus formed and coupling at ice temperature with a coupling component of the benzene, naphthalene and pyrazolone series, said coupling component containing an $NH_2$ group, from 0 to 1 OH group and from 0 to 2 sulfo groups, said diazotizable compound and coupling component being so chosen that at least one of them possesses a sulfo group, and subjecting the monomeric dye thus formed to a temperature between 10° and 70° C., in alkaline aqueous medium, to effect polymerization of said monomeric dye by elimination of HCl, and recovering the resulting water-soluble polymer.

2. A process of producing a water-soluble, polymeric azo dye adapted to react with fiber containing radicals of the group consisting of OH, ONa and $NH_2$, which comprises reacting, at ice temperature and in the presence of an acid absorbing agent, essentially equimolecular quantities of cyanuric chloride and of 2,4-diaminobenzene sulfonic acid, whereby to form a diazotizable intermediate of the formula

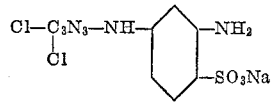

wherein $C_3N_3$ designates the triazine ring, diazotizing the intermediate thus formed and coupling at ice temperature with a coupling component of the benzene, naphthalene and pyrazolone series, said coupling component containing an $NH_2$ group, from 0 to 1 OH group and from 0 to 2 sulfo groups, and subjecting the monomeric dye thus formed to a temperature between 10° and 70° C., in alkaline aqueous medium, to effect polymerization of said monomeric dye by elimination of HCl, and recovering the resulting water-soluble polymer.

References Cited in the file of this patent

UNITED STATES PATENTS

| | | |
|---|---|---|
| 2,268,919 | Anderau | Jan. 6, 1942 |
| 2,391,164 | Kaiser | Dec. 18, 1945 |
| 2,470,769 | Gaspar | May 24, 1949 |
| 2,763,640 | Riat et al. | Sept. 18, 1956 |
| 2,795,576 | Fasciati | June 11, 1957 |
| 2,824,093 | Benz et al. | Feb. 18, 1958 |
| 2,835,663 | Benz | May 20, 1958 |
| 2,844,574 | Gaspar et al. | July 22, 1958 |
| 2,891,940 | Fasciati | June 23, 1959 |

FOREIGN PATENTS

| | | |
|---|---|---|
| 754,071 | Great Britain | Aug. 1, 1956 |

OTHER REFERENCES

Fierz-David et al.: "J. Soc. Dyers and Colourists," vol. 53, 1937, pages 424–431.